Jan. 7, 1969                A. RONCHESE                3,420,411
                DISPENSER FOR QUANTITIES OF HOT WATER
                        Filed July 18, 1967
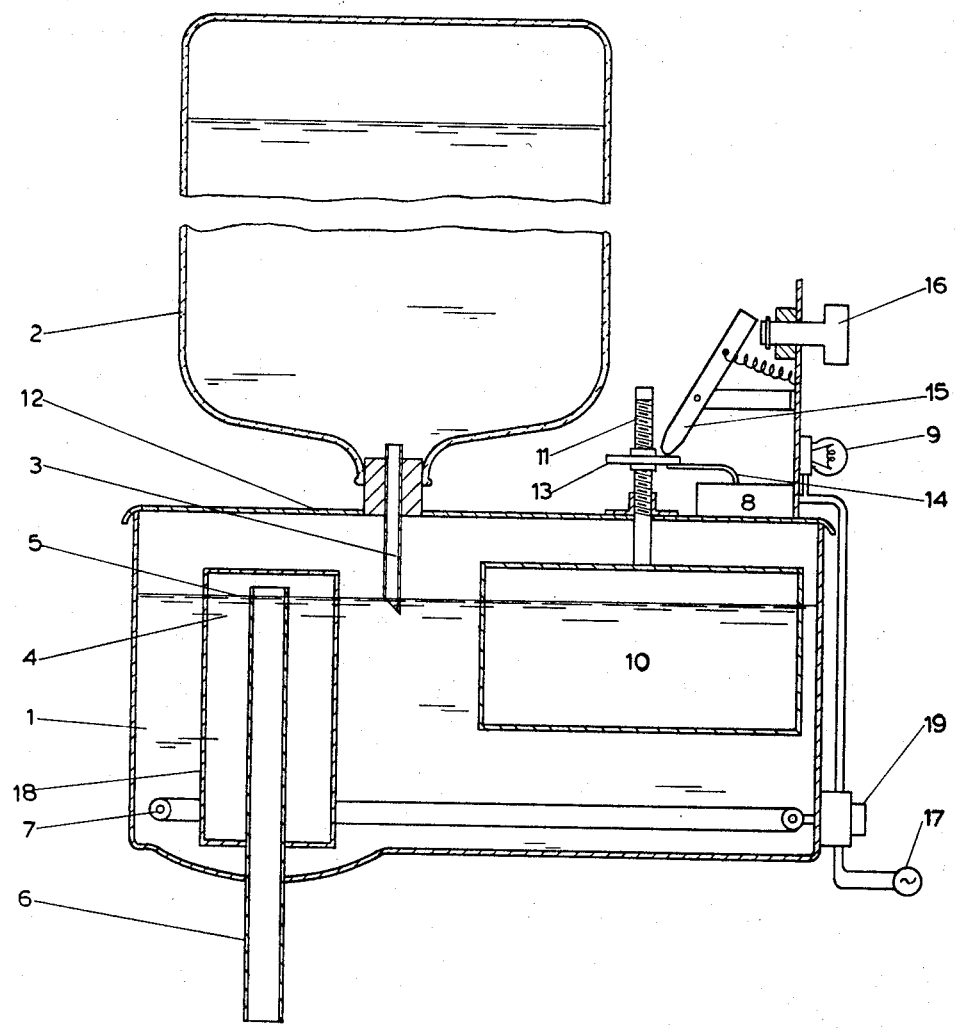
INVENTOR
ALDO RONCHESE
BY  *Shoemaker and Mattare*
ATTORNEYS

United States Patent Office

3,420,411
Patented Jan. 7, 1969

3,420,411
DISPENSER FOR QUANTITIES OF HOT WATER
Aldo Ronchese, 20 Saint John's Road, Houghton, Johannesburg, Transvaal, Republic of South Africa
Filed July 18, 1967, Ser. No. 654,174
Claims priority, application Republic of South Africa, Aug. 5, 1966, 66/4,636
U.S. Cl. 222—67
Int. Cl. G01f 13/00
5 Claims

ABSTRACT OF THE DISCLOSURE

Dispensing apparatus for heating and automatically dispensing a predetermined quantity of boiling water by a siphonic action initiated by the boiling of the water.

---

This invention relates to a means whereby a predetermined quantity of water at substantially boiling point can be obtained automatically as and when required.

Various water dispensing apparatuses have developed some of which are coin operated, and in general these apparatuses maintain the temperature of the water at the temperatures at which they are dispensed by means of thermostatic controls. Commercially practical controls of this nature are not very accurate particularly when it is desired to dispense water at boiling point temperatures.

It is the object of the present invention to provide means whereby boiling water can be dispensed in predetermined quantities, and is only heated when required.

According to this invention there is provided a hot water dispensing apparatus comprising a container adapted to be fed to constant level from a water supply means a heating element in the container connected to a float controlled switch, means for releasably maintaining said float in a depressed position, and a siphonic outlet from the container located above the normal water level in the container.

The invention is illustrated diagrammatically in the accompanying drawings, as applied to apparatus for making a cup of instant coffee or tea.

As shown in the drawings there is provided a container 1 having an effective volume sufficient substantially to fill a cup, this effective volume being variable within certain limits as hereinafter described.

The container 1 supports a reservoir 2 closed at the top and having a bottom outlet 3 extending into the interior of the container 1. The reservoir 2 may conveniently be in the form of an inverted bottle fitted with an outlet tube 3 as shown in the drawings. The height of the lowermost portion of the outlet tube 3 will thus determine the maximum level of water in the container 1 which can be discharged therein by gravity from the reservoir 2. It will be appreciated that other means for supplying water to constant level may be used such as a float operated cock connected to the water main.

The container also has a siphonic outlet 4 the upper level of which is slightly above the normal water level 5 in the container 1 and discharges via a tube 6 extending through the bottom of the container 1. The latter is preferably downwardly dished around the tube 6.

The container 1 has also an electrical heating element 7 located therein and designed, when energised, to heat the water to boiling point in the shortest conveniently possible time, for example in a period of the order of forty seconds with the water in the reservoir at room temperature. However this period could be shortened by supplying preheated water from the reservoir. The heating element 7 is connected in circuit with a float operated micro-switch 8 and a pilot or warning lamp 9.

The float control for the micro-switch comprises a float 10 in the container, said float embodying a stem 11 projecting upwardly through the top 12 of the container 1. A projection such as a collar 13 on the stem 11 rests on the micro-switch arm 14 and is held in a position lower than it would normally assume due to the buoyancy of float 10 by a trigger mechanism. In this position of the collar 13 the micro-switch 8 is held open. The trigger mechanism may be of any suitable type and as illustrated may conveniently be in the form of a spring loaded lever 15 movable by a push button 16 to disengage from the collar 13.

Manual depression of the push button 16 allows the float assembly to rise thereby allowing the micro-switch to close and connect the mains supply 17 through the element 7 and pilot light 9 which thus indicates that the elements are operative.

When the water reaches boiling point it overflows into the siphonic outlet 4 so that the predetermined quantity of water in the container 1 is automatically dispensed at boiling point temperature. The overflow of the water into the siphonic outlet 4 is due partly to natural expansion on heating, partly due to displacement of water in container 1 due to bubbles forming therein during boiling, and partly due to slight pressure above the water tending to make it flow up the siphonic outlet casing 18. Due to all these factors the level of the top of siphonic outlet is not critical to ensure discharge on the boiling of the water. Generally, it may be of the order of six millimeters above the water level 5. The bore of the siphonic outlet 4 and discharge tube 6 is, however, much greater than that of the bottom outlet 3 to ensure a high rate of discharge relative to inflow into container 1 during discharge through the siphonic outlet.

As soon as the water level in the container drops sufficiently the float also drops causing the collar 13 to press down the micro-switch arm 14 thereby opening the switch and allowing the lever 15 of the trigger mechanism to be repositioned above the collar 13.

After discharge of the boiling water the container is then relatively slowly recharged from the reservoir 2 and when the water in the container reaches its original level the assembly is ready for re-use. While the normal water level in the container is preferably kept constant the volume of water in the container can be varied within certain limits by varying the position of the collar 13 on the stem 11 which is screw threaded for this purpose. The position of the collar 13 determines the amount the float is submerged in the water and thus the effective volume of the container 1.

Should the reservoir run dry the float cannot rise to close the micro-switch thus giving a safety feature to the dispenser. As an added safety feature the heating element may be fitted with a manually resettable thermostatic cut-out 19 which acts to cut the electrical supply from the element 7 should it reach a dangerously high temperature. Under normal circumstances, however, this thermostatic cut-out will not be operative. While the assembly has been illustrated in diagrammatic form purely to show the operation thereof, in practice it will be enclosed in a housing of suitably attractive appearance which will normally embody a supporting platform for the cup or other container to be filled with boiling water, and the platform may be associated with a drain and spillage reservoir.

What I claim as new and desire to secure by Letters Patent is:

1. A hot water dispensing apparatus comprising a container, a water supply means discharging into the container, means maintaining constant the normal liquid level in the container, a heating element in the container, a switch connected to said element and a float in the container controlling operation of the switch, means releasably maintaining aid float in a depressed position thereby holding the switch open and a siphonic outlet from the container located above the normal liquid level therein.

2. A hot water dispensing apparatus comprising a container, water supply means discharging into the container, means maintaining constant the normal liquid level in the container, a heating element in the container, a switch connected to said element and a float in the container controlling operation of the switch a manually releasable trigger mechanism maintaining said float in a depressed position thereby holding the switch open and a siphonic outlet from the container located above the normal liquid level therein.

3. A hot water dispensing apparatus in accordance with claim 2 including an upward extension of the float, a lateral projection on said upward extension and an arm operatively connected to the switch and positioned below and in the downward path of movement of the lateral projection, said trigger mechanism bearing on the top of the lateral projection thereby limiting upward movement of the upward extension due to the buoyancy of the float.

4. A hot water dispensing apparatus in accordance with claim 2 including an upward extension of the float, a lateral projection adjustably mounted on said upward extension, an arm operatively connected to the switch and positioned below and in the downward path of movement of the lateral projection, said trigger mechanism bearing on the top of the lateral projecting thereby limiting upward movement of the upward extension due to the buoyancy of the float.

5. A hot water dispensing apparatus in accordance with claim 2 in which the water supply means comprises a closed reservoir mounted above the container and the means for maintaining constant the normal liquid level in the container comprises a downwardly extending outlet from the reservoir, the bore of said outlet having considerably lesser cross-sectional area than the effective cross-sectional area of the bore of the siphonic outlet.

References Cited

UNITED STATES PATENTS 3,159,190 12/1964 Skiera et al. _____ 222—67 X
3,179,035 4/1965 Lockett _____ 222—67 X STANLEY H. TOLLBERG, *Primary Examiner.*

U.S. Cl. X.R.
222—204